United States Patent [19]
Pippin

[11] Patent Number: 5,289,218
[45] Date of Patent: Feb. 22, 1994

[54] APPARATUS FOR ASSISTING CAMERA IN PHOTOGRAPHING CYLINDRICAL OBJECTS

[76] Inventor: L. Turner Pippin, P.O. Box 771558, Eagle River, Ak. 99577

[21] Appl. No.: 5,773

[22] Filed: Jan. 19, 1993

[51] Int. Cl.$^5$ .............................. G03B 29/00
[52] U.S. Cl. ..................................... 354/80
[58] Field of Search ............... 354/75, 76, 80, 292

[56] References Cited

U.S. PATENT DOCUMENTS

| | | |
|---|---|---|
| 3,462,218 | 8/1969 | Pfaff. |
| 3,471,236 | 10/1969 | Pearson. |
| 3,517,447 | 6/1970 | Fox. |
| 3,820,130 | 6/1974 | Cornelison, Jr. et al. ............ 354/76 |
| 4,063,259 | 12/1977 | Lynch et al. ......................... 354/76 |
| 4,372,659 | 2/1983 | Ogawa ................................. 354/80 |
| 4,457,603 | 7/1984 | Gebhart et al. ...................... 354/80 |

FOREIGN PATENT DOCUMENTS 5240327  3/1977  Japan.

*Primary Examiner*—David M. Gray
*Attorney, Agent, or Firm*—Richard C. Litman

[57] ABSTRACT

A photograph assistance device for assisting a stationary camera in photographing a curved surface of cylindrical objects, such as a finger print wrapped around a bullet casing or soda can. The cylindrical object is moved at a constant speed into a photograph area of the camera while rotated at a constant rotating speed. The moving speed of the object is preferably determined so that the object can successfully pass through the photograph area of the camera while the camera and stop is adjusted for a small diameter opening for the best depth of field. The rotating speed of the object is preferably determined so that the image of the object can be rotated onto the field without producing a distorted image, that is, a stretched or compressed image.

15 Claims, 4 Drawing Sheets

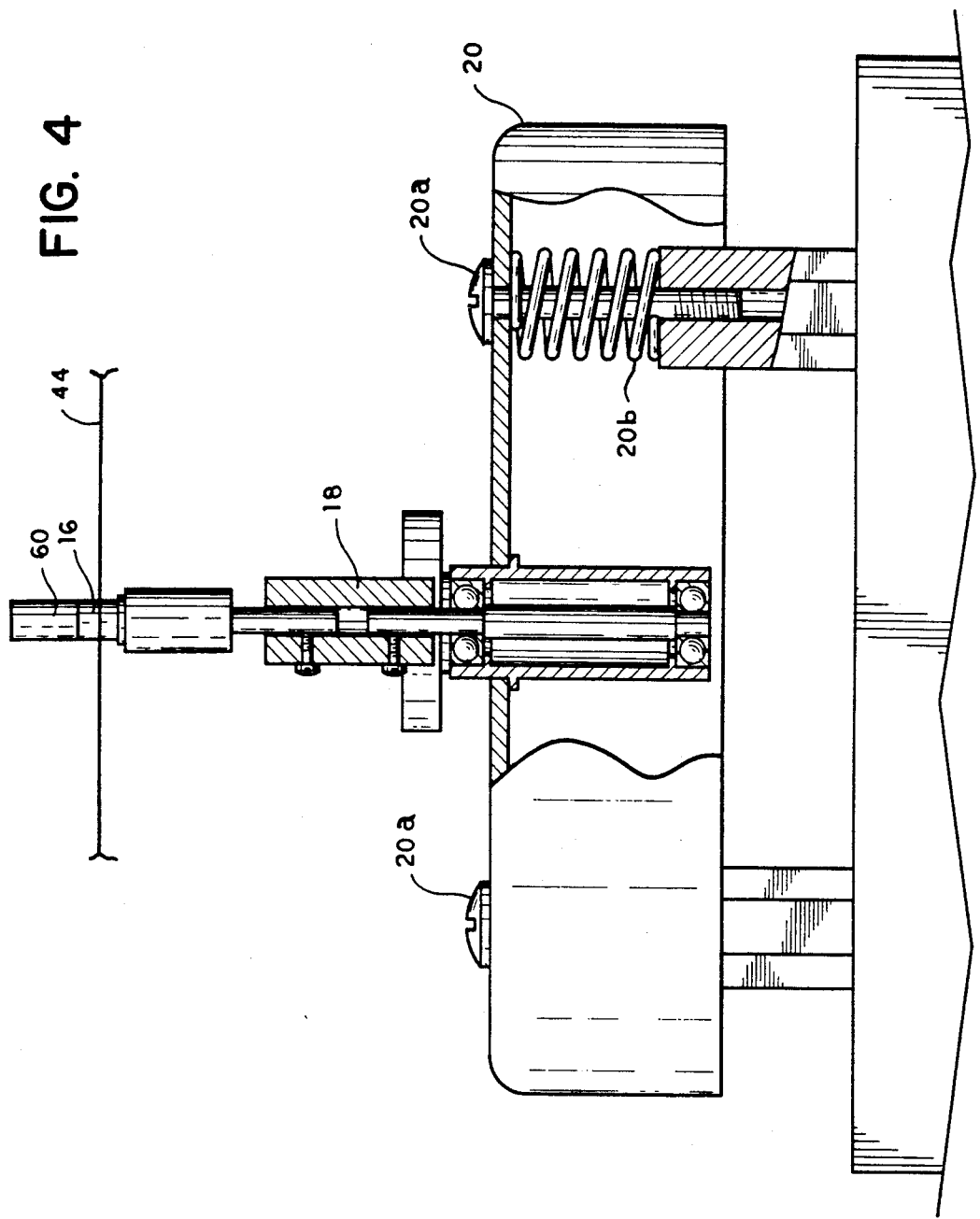

APPARATUS FOR ASSISTING CAMERA IN PHOTOGRAPHING CYLINDRICAL OBJECTS

BACKGROUND OF THE INVENTION

1. FIELD OF THE INVENTION

The present invention relates generally to photography, and more particularly to an apparatus for assisting a camera in photographing cylindrical objects.

2. DESCRIPTION OF THE PRIOR ART

It is sometimes required to photograph a curved surface of a cylindrical object, such as a fingerprint, for example, on a coat hanger, a soda can, a cartridge casing, or cocaine tooter. However, it is arduous to take several different-angled pictures of the cylindrical object and compose them later into one entire view of the cylindrical object. Accordingly, some attempts have been made to provide devices for automatically photographing the curved surface of the cylindrical object. One such device, for example, is shown in U.S. Pat. No. 3,462,218 issued Aug. 19, 1969 to Pfaff. Pfaff's device moves a camera in a direction parallel to a diameter of a stationary cylindrical object. Although Pfaff's device can automatically photograph several different-angled pictures of the object it has the following disadvantages, namely: Pfaff's device can photograph only a 180° view of the object; the object's image taken by the camera includes distortion since the camera is not moved parallel to the circumference of the cylindrical object; and the object's image taken by the camera is blurred since the camera is moved while vibrated slightly.

An alternative device is shown in U.S. Pat. No. 4,372,659 issued Feb. 8, 1983 to Ogawa. Ogawa's device arranges a cylindrical object on a first disk, and a slit camera and a mirror on a second disk. The 360° view of the object reflected in the mirror is photographed by the camera by rotating either the first disk or the second disk. The successive film frames are exposed in synchronization with the relative rotation of the object. Although Ogawa's device can automatically photograph the 360° view of the object, it has the following disadvantages, namely, Ogawa's device requires the expensive slit camera in which film is fed continuously behind the slit and it is difficult to synchronize the film feeding speed and the rotation speed of the object.

Yet another device is shown in U.S. Pat. No. 4,457,603 issued Jul. 3, 1984 to Gebhart et al. Gebhart et al. discloses a stationary camera and a rotating cylindrical object. Although Gebhart's device can automatically photograph the 360° view of the object, it has the following disadvantages, namely, Gebhart's device requires, like Ogawa's device, a specific camera in which film is fed continuously behind the slit and it is difficult to synchronize the film feeding speed and the rotation of the object.

Japanese Patent Application No. 52-40327 filed by Tomita and Laid-Open Mar. 29, 1977 discloses another device in which three stationary cameras are placed at different-angled positions. Although Tomita's device can automatically photograph three different-angled pictures of the object it has the following disadvantages. Tomita's device can photograph only a 180° view of the object and it is arduous to compose three pictures into one entire view of the cylindrical object.

Other patents which may be deemed of interest is U.S. Pat. No. 3,471,236 issued Oct. 7, 1969 to Pearson which discloses a prism for an optical stroboscope; U.S. Pat. No. 3,517,447 issued Jun. 30, 1970 to Fox which discloses an optical-reimaging system; U.S. Pat. No. 3,820,130 issued Jun. 25, 1974 to Cornelison, Jr. et al. which discloses a golf instruction device; and U.S. Pat. No. 4,063,259 issued Dec. 13, 1977 to Lynch et al. which discloses a method of matching a golfer with a golf ball, a golf club or style of play.

SUMMARY OF THE INVENTION

The present invention relates to an apparatus for assisting a camera in photographing cylindrical objects. The apparatus according to the present invention provides assistance for a stationary camera in photographing a curved surface of an object. The apparatus comprises rotary means and mobile means. The rotary means is coupled to the object for rotating the object around a predetermined axis. The mobile means is coupled to the rotary means for moving the rotary means along a line perpendicular to the predetermined axis. Thus, the object is rotated by the rotary means as it passes through a photograph area of the camera. While the object passes through the photograph area of the camera, the camera shutter is locked open.

A photograph system according to the present invention for photographing a curved surface of an object is made up of a stationary camera, and the aforementioned apparatus optically coupled to the camera for assisting the camera in photographing the curved surface of the cylindrical objects.

According to one feature of the present invention, the camera is stationary so as not to make a blurred image of the object. According to another feature of the present invention, a standard and relatively inexpensive camera may be used for the present invention. According to another feature of the present invention, the speed of the mobile means is controlled to provide sufficient time and the environmental lighting is controlled to provide sufficient illumination. The control of the mobile means and environmental lighting permits the use of the smaller iris opening (lens opening) sizes of the camera which provides a better depth of field. According to another feature of the present invention, the rotary means rotates the object so as to automatically make one entire view thereof.

Accordingly, it is a general object of the invention to provide a novel and useful apparatus for assisting a camera in photographing a cylindrical object in which the above disadvantages are eliminated.

Another object of the invention is to provide a relatively inexpensive device for assisting a camera in photographing a cylindrical object without blur and distortion.

Still another object of the present invention is to provide a apparatus for assisting a camera in photographing a cylindrical object without a complicated synchronization control.

Yet another object of the present invention is to provide a device for assisting a camera in photographing a cylindrical object in which a 360° view of the object can be generated without composing several pictures.

Other objects and further features of the present invention will become apparent from the following detailed description when read in conjunction with the accompanying drawing.

BRIEF DESCRIPTION OF THE DRAWINGS

FIG. 4 shows a partial cross-section of the turntable and the turntable bearing of the device shown in FIG. 1.

Similar reference characters denote corresponding features consistently throughout the attached drawings.

DETAILED DESCRIPTION OF THE PREFERRED EMBODIMENT

Figure 1:
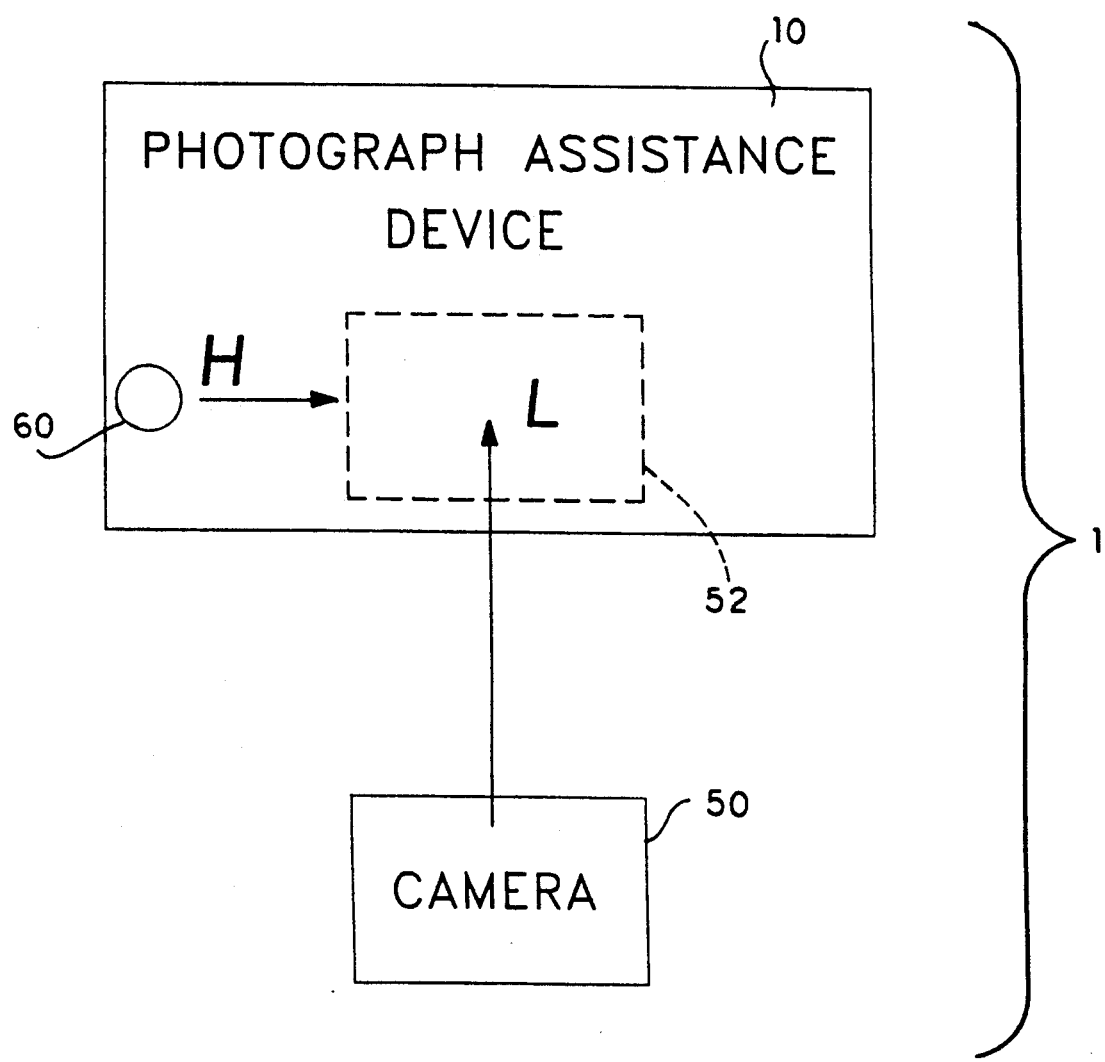
FIG. 1 shows a block diagram of a photograph system according to the present invention.

A description will now be given of a photograph system 1 according to the present invention with reference to FIGS. 1 to 4. The photograph system 1 comprises a photograph assistance device 10 and a camera 50. The photograph assistance device 10 is engaged with a cylindrical object 60. The camera 50 is optically connected to the photograph assistance device 10 so that the camera 50 can photograph a curved surface of the cylindrical object 60.

The photograph assistance device 10 according to the present invention comprises a frame 12, a pair of shafts 14a and 14b a turntable 16, a turntable bearing 18, a platform car 20, a driving device 22, and a rail 46. The shafts 14a and 14b are opposite to each other and secured to the frame 12. The turntable bearing 18 is engaged with the turntable 16. The platform car 20 is movably disposed on the frame 12 and coupled to the turntable bearing 18. The driving device 22 is connected to the frame 12 and the platform car 20. The rail 46 is secured on the frame 12 and engaged with a wheel of the platform car 20.

Figure 3:
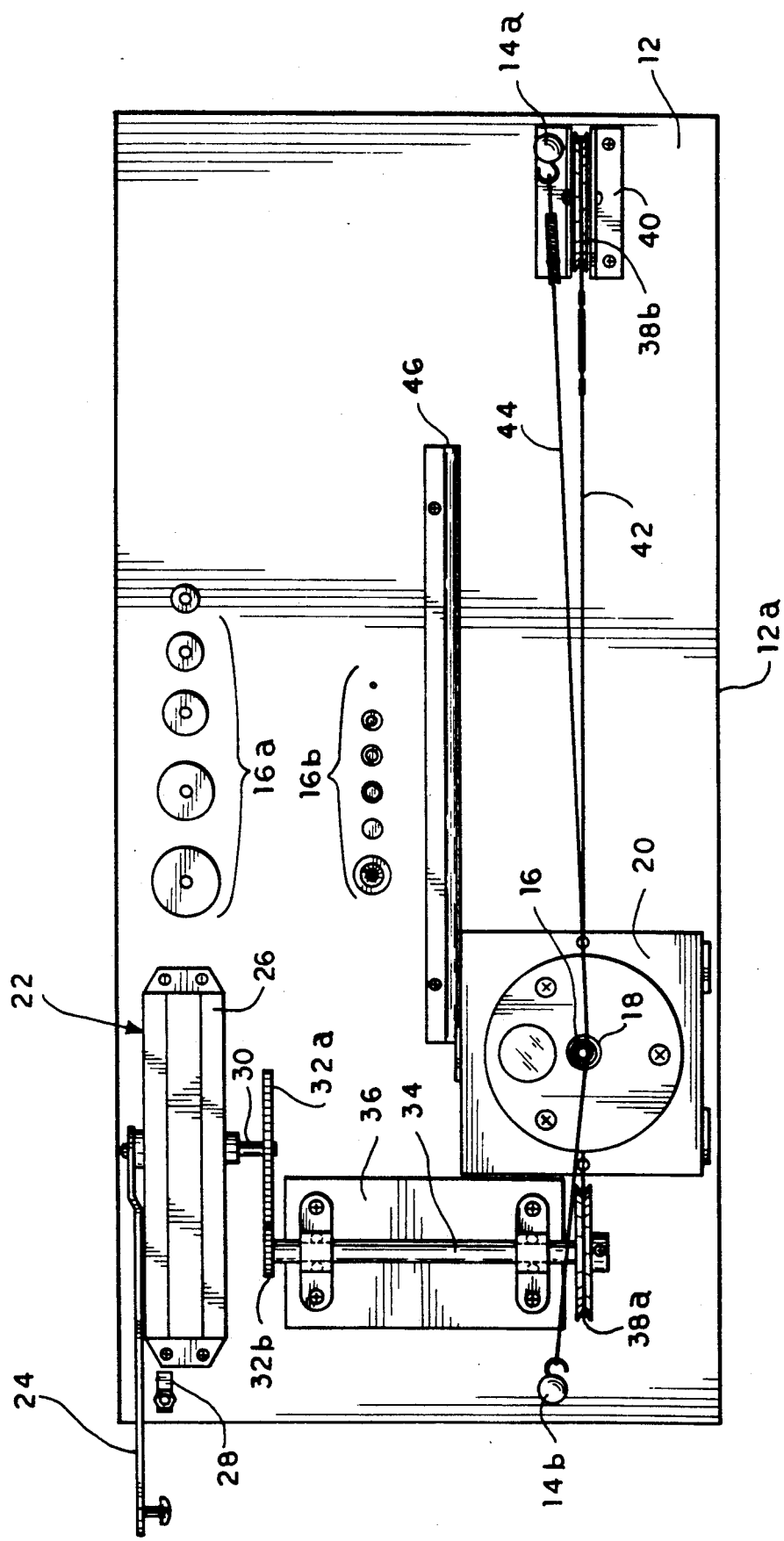
FIG. 3 shows a top plan view of the photograph assistance device shown in FIG. 1.

The frame 12 is fixed on a stationary surface. The frame 12 has a rectangular shape, as shown in FIG. 3. As described later, the platform car 20 moves along the longitudinal side 12a of the rectangle from right to left (in a direction H); the longitudinal side 12a is longer than a circumference of the cylindrical object so that a 360° view of the cylindrical object 60 can be photographed by the camera 50.

The shafts 14a and 14b are perpendicularly secured on the frame 12. A direction from the shaft 14a to the shaft 14b is arranged, as shown in FIG. 3, parallel to the direction H. Preferably, each of the shafts 14a and 14b is made of a metallic material so as not to be easily bent. A distance between the shafts 14a and 14b is longer than a moving distance of the platform car 20.

Figure 2:
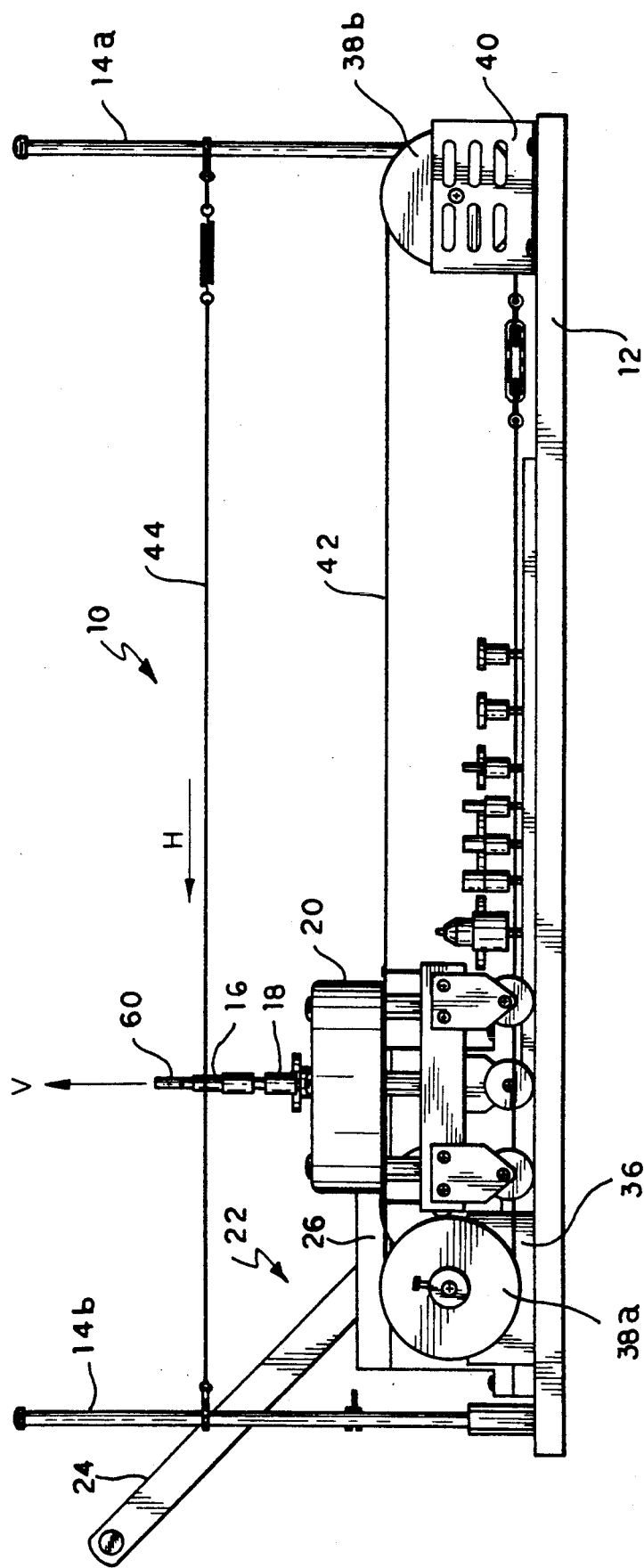
FIG. 2 shows a front elevation view of a photograph assistance device of the photograph system shown in FIG. 1.

The turntable 16 is concentrically engaged with the cylindrical object 60 so as to rotate it around an axis V shown in FIG. 2. According to this embodiment, a plurality of differentsized turntables 16 have been prepared so as to photograph various sized cylindrical objects 60 without distortion with respect to a moving direction of the object 60. As discussed below, the moving direction of the object 60 is the direction H. These turntables 16 comprise table parts 16a and tubular parts 16b. The turntable 16 may have a groove having a rough inner surface at a side surface thereof so as to be engaged with a turntable-rotating string 44, which will be described later.

The turntable bearing 18 connects the turntable 16 to the platform car 20, and allows the turntable 16 to rotate relative to the platform car 20. As shown in FIGS. 3 and 4, the turntable bearing is secured on the platform car 20 by three screws 20a and three springs 30b. Each screw 20a and each spring 20b determine an elevational distance of the turntable bearing 18 relative to the platform car 20 and a direction of the axis V of the object 60. The direction V can be changed (for leveling the turntable 16) by clamping each screw 20a. If the turntable 16 has no groove to be engaged with the turntable-rotating string 44, then the string 44 can rest against the top side of the turntable 16.

The platform car 20 carries the turntable 18 and the cylindrical object 60 to a photograph area 52 of the camera 50. When cocking the driving device 22, it moves the object 60 in a direction opposite to the direction H. When the driving device 22 is cocked, it compresses a spring disposed therein. When the driving device 22 is released from its cocked position, the spring forces hydraulic fluid through small adjustable jets or apertures located interiorly of the driving device 22, which allows the spring to return to it normal (uncompressed) posture at a slow and constant rate, moving the object 60 from the right to the left in the direction H as the object 60 is rotated around the axis V. The object 60 typically moves from the right to the left over a period of approximately 60 to 90 seconds. The driving device comprises a lever 24, a body 26, a focus lock 28, a shaft 30, a pair of gears 32a and 32b, a transmission shaft 34, a shaft stand 36, a pair of pulleys 38a and 38b, a pulley stand 40, a car-driving string 42, and a turntable-rotating string 44. The body 26 has a shaft 30, one end of which is connected to the lever 24, and the other end of which is connected to the gear 32a. The focus lock 28 is rotatable and engageable with the lever 24. The gear 32b is engaged with the gear 32a. The transmission shaft 34 is rotatably secured on the shaft stand 36 by a plurality of screws. One end of the transmission shaft 34 is engaged with the gear 32b, and the other end thereof is engaged with the pulley 38a. The pulleys 38a and 38b and the platform car 20 are connected via the car-driving string 42. The pulley stand 40 is engaged with the pulley 38b and secured on the frame 12. The turntable-rotating string 44 is suspended between the shafts 14a and 14b while spring-biased.

The lever 24 is movable between uppermost and lowermost positions. Lever 24, located at the midpoint position is engageable with the focus lock so as to be retained at the midpoint position. In the midpoint position (or in the photographing area 54), the camera 50 may be set up and adjusted to photograph the object 60. The body 26 uses a hydraulic motor. However, any type of motor may be used to the present invention. The lever gradually moves upward from the lowermost position by a hydraulic power generated by the body 26. As the lever 24 moves upward, the object 60 moves from the right to the left passing in front of the camera 50 through the photographing area 54.

The gears 32a and 32b are arranged parallel to the direction H. The transmission shaft 34 is arranged vertical to the direction H, as shown in FIG. 3. The pulleys 38a and 38b are arranged parallel to the direction H, and the car-driving string 42 is arranged parallel to the direction H. The car-driving string 42 is wound around the pulleys 38a and 38b while being spring-biased. The rail 46 is engaged with at least one wheel of the platform car 20 and arranged along the direction H so as to guide the platform car 20 along the direction H. The car-driving string 42 may be made of nylon string. The turntable-rotating string 44, preferably wax string, may be engaged with the groove of the turntable 16 or the outer surface of the turntable 16 providing the turntable 16 does not have an outer groove. The friction between the turntable 16 and the turntable-rotating string 44 rotates the turntable 16 as the turntable 16 is moved along the turntable-rotating string 44 by the driving device 22.

The rail 46 guides the platform car 20 with the turntable 16 in the direction H which is perpendicular to an optical axis L of the camera 50, as shown in FIG. 1. The camera 50 photographs the cylindrical object located in the photograph area 52. The camera 50 includes a shutter (not shown) which may be locked open as the object passes through the photograph area 52. The camera 50 includes a lens (not shown) with the optical axis L, as shown in FIG. 1.

In this embodiment, the object 60 has a cylindrical shape. However, the present invention can be applied to the object 60 which has a cylindroid shape.

Next follows a description of an operation of the photograph system according to the present invention. First, the photograph assistance device 10 and the camera 50 are arranged so as to define the photograph area 52 of the camera 50. Then, the cylindrical object 60 is attached to the turntable 16 which has the same size as that of the object 60. In this embodiment, a driving force is applied by the driving device 22 so as to move and rotate the object 60 past the view of the camera 50, without distortion. Distortion is eliminated only if a diameter of the turntable 16 is equal to that of the object 60. Therefore, if the turntable 16 is larger than the object 60, the object's image taken by the camera 50 is stretched in the direction H; whereas if the turntable 16 is smaller than the object 50 compressed in the direction H. According to the present invention, a generating line of the object 60 which is parallel to the axis V is perpendicular to the direction H and the optical axis L of the camera 50 so as to prevent distortion of the object's image with respect to the generating line of the object 60. However, even if the axis V is not perpendicular to the optical axis L of the camera 50, the curved surface of the object can be roughly recognized.

Next, the lever 24 is advanced down and engaged with the focus lock 28. When the focus lock 28 is released, the lever 24 gradually moves upward by means of the hydraulic power of the body 26 and rotates the gear 32a via the shaft 30 of the body 26. In response, the gear 32a rotates the gear 32b with the transmission shaft 34. The pulley 38a engaged with the transmission shaft 34 is consequently rotated moving the platform car 20 along the direction H. The turntable 16 and the object 60 are thus moved along the direction H. The driving device 22 moves the object 60 at a constant speed along the direction H so as not to generate distortion in the image taken by the camera 50.

When the turntable 16 moves in the direction H, friction between the turntable 16 and the turntable-rotating string 44 rotates the turntable 16 counterclockwise. Consequently, the object 60 rotates with the turntable 16. Since the turntable 16 moves at the constant speed, the object 60 is rotated at a constant rotating speed.

The camera begins to expose the object's image when the object 60 enters the photograph area 52 of the camera 50. The shutter (not shown) of the camera 50 is locked open when the object 60 enters the photograph area 52 and is closed after the object 60 passes the photograph area 52. In addition, the photograph area is broad enough to photograph the entire view of the cylindrical object 60.

According to the present invention, the driving device 22 moves as well as rotates the object 60. However, a distinct mobile unit and a rotary unit may be provided. In that case, the mobile unit moves the object 60 at a constant speed, while the rotary unit rotates the object 60 at a constant rotating speed. The turntable bearing 18 and the platform car 20 may be regarded as the mobile unit. Additionally, the camera 50 may be moved in the direction H while the platform 20 is made stationary.

It is to be understood that the present invention is not limited to the sole embodiment described above, but encompasses any and all embodiments within the scope of the following claims.

What is claimed is:

1. An apparatus for assisting a stationary camera in photographing a curved surface of an object, said apparatus comprising:

rotary means, coupled to the object, for rotating the object around a predetermined axis; and mobile means, coupled to said rotary means, for moving said rotary means along a line perpendicular to said predetermined axis, whereby the object rotated by said rotary means can pass through a photograph area of the camera within an exposure time of the camera.

2. The apparatus according to claim 1, wherein said rotary means includes means for rotating the object at a predetermined rotating speed so that the object can be rotated at least one full rotation within the exposure time while passing through the photograph area.

3. The apparatus according to claim 1, wherein the object has a cylindrical shape, and said mobile means comprises means for positioning said rotary means so that a generating line of the object can be perpendicular to an optical axis of the camera.

4. The apparatus according to claim 1, wherein said object has a cylindrical shape, and said rotary means includes means for rotating the object at a constant rotating speed.

5. The apparatus according to claim 1, further comprises:

a frame; and a pair of shafts perpendicularly secured to said frame, and wherein said rotary means comprises:

a string suspended between said shafts; and a turntable, coupled to the object and said mobile means and engaged with said string, which is rotatable with the object along said string as said turntable is moved by said mobile means.

6. The apparatus according to claim 5, wherein said mobile means comprises:

a platform car, movably provided on said frame;

a turntable bearing, coupled to said platform car and said turntable, which allows said turntable to rotate relative to said platform car; and driving means, coupled to said platform car, which moves said platform car on said frame, whereby the object is moved with said platform car while rotated by said turntable.

7. The apparatus according to claim 8, wherein said driving means comprises a spring biased hydraulic motor.

8. The apparatus according to claim 5, wherein there are a plurality of different-sized cylindrical objects, and said rotary means comprises a plurality of turntables, which are differently dimensioned so as to be used for the different-sized cylindrical objects.

9. The apparatus according to claim 8, wherein each one of plurality of turntables have different diameters, and wherein said apparatus further comprises means for selecting a turntable from among said plurality of turntables, which has a diameter equal to that of the object.

10. The apparatus according to claim 1, wherein said mobile means comprises guiding means, coupled to said rotary means, for guiding said rotary means in a direction perpendicular to an optical axis of the camera.

11. The apparatus according to claim 1, further comprising means for adjusting a height of the object so that the object can properly pass through the photograph area of the camera.

12. A photograph system for photographing a curved surface of an object comprising:

a stationary camera; and an apparatus, optically coupled to said camera, for assisting said camera in photographing the curved surface of the object, said apparatus including:
rotary means, coupled to the object, for rotating the object around a predetermined axis; and
mobile means, coupled to said rotary means, for moving said rotary means along a line perpendicular to said predetermined axis, whereby the object rotated by said rotary means can pass through a photograph area of said camera within an exposure time of said camera.

13. The photograph system according to claim 12, wherein said mobile means is coupled to said rotary means so as to move the same.

14. The photograph system according to claim 13, wherein said mobile means moves said rotary means in a direction perpendicular to an optical axis of said camera.

15. The apparatus according to claim 12, further comprising means for adjusting a height of said camera so that the object can properly pass through the photograph area of said camera.

* * * * *